(12) United States Patent
Chuang et al.

(10) Patent No.: US 9,678,649 B2
(45) Date of Patent: Jun. 13, 2017

(54) METHOD FOR DISPLAYING PHOTOS AND ELECTRONIC DEVICE FOR USING THE SAME

(71) Applicant: HTC Corporation, Taoyuan County (TW)

(72) Inventors: Sheng-Chin Chuang, Taoyuan County (TW); I-Fen Shih, Taoyuan County (TW)

(73) Assignee: HTC Corporation, Taoyuan (TW)

(*) Notice: Subject to any disclaimer, the term of this patent is extended or adjusted under 35 U.S.C. 154(b) by 352 days.

(21) Appl. No.: 14/277,060

(22) Filed: May 14, 2014

(65) Prior Publication Data
US 2015/0331603 A1    Nov. 19, 2015

(51) Int. Cl.
*G06F 3/0481*     (2013.01)
*G06F 3/0485*     (2013.01)

(52) U.S. Cl.
CPC .................. *G06F 3/04855* (2013.01)

(58) Field of Classification Search
None
See application file for complete search history.

(56) References Cited

U.S. PATENT DOCUMENTS

| | | | | |
|---|---|---|---|---|
| 2002/0003577 A1* | 1/2002 | Kitsugi | ............ | H04N 1/00411 |
| | | | | 348/231.99 |
| 2002/0140826 A1* | 10/2002 | Sato | ............ | H04N 1/2112 |
| | | | | 348/222.1 |
| 2004/0202456 A1* | 10/2004 | Sasagawa | ............ | H04N 5/772 |
| | | | | 386/333 |
| 2006/0146167 A1* | 7/2006 | Aizawa | ............ | G11B 27/034 |
| | | | | 348/333.01 |
| 2008/0088710 A1* | 4/2008 | Iwamoto | ............ | H04N 1/32128 |
| | | | | 348/220.1 |
| 2008/0089616 A1* | 4/2008 | Gwak | ............ | H04N 5/232 |
| | | | | 382/309 |
| 2009/0207279 A1* | 8/2009 | Ochi | ............ | H04N 5/23219 |
| | | | | 348/231.99 |
| 2009/0217204 A1* | 8/2009 | Yamashita | ............ | G06F 17/3028 |
| | | | | 715/838 |
| 2010/0026843 A1* | 2/2010 | Tezuka | ............ | H04N 1/2145 |
| | | | | 348/231.2 |
| 2011/0096199 A1* | 4/2011 | Ejima | ............ | H04N 5/772 |
| | | | | 348/231.99 |
| 2012/0249853 A1* | 10/2012 | Krolczyk | ............ | H04N 1/00448 |
| | | | | 348/333.01 |
| 2012/0300092 A1* | 11/2012 | Kim | ............ | H04N 1/215 |
| | | | | 348/222.1 |
| 2013/0222671 A1* | 8/2013 | Tseng | ............ | H04N 5/23216 |
| | | | | 348/333.11 |

(Continued)

*Primary Examiner* — Phenuel Salomon
(74) *Attorney, Agent, or Firm* — Jianq Chyun IP Office (57) ABSTRACT

The invention provides a method for displaying photos. The method of the present invention comprises displaying a photo marked with a burst shooting icon, wherein the displayed photo corresponds to a photo group having a plurality of photos successively taken in a burst mode. A selection signal is received through the burst shooting icon. Upon the received selection signal, one of the photos in the photo group is displayed accompanying with a tool bar, wherein the tool bar at least includes a seek bar and a play key. An operating signal is received through the tool bar and upon the received operating signal, the photos in the photo group are displayed.

21 Claims, 5 Drawing Sheets

(56) References Cited

U.S. PATENT DOCUMENTS

| | | | | |
|---|---|---|---|---|
| 2014/0092260 A1* | 4/2014 | Escobedo | .......... | H04N 5/23206 |
| | | | | 348/207.1 |
| 2014/0226053 A1* | 8/2014 | Winer | ................ | H04N 5/23293 |
| | | | | 348/333.05 |
| 2014/0337324 A1* | 11/2014 | Chao | ................. | G06F 17/30274 |
| | | | | 707/722 |
| 2014/0354845 A1* | 12/2014 | Molgaard | .............. | H04N 1/215 |
| | | | | 348/222.1 |

* cited by examiner

METHOD FOR DISPLAYING PHOTOS AND ELECTRONIC DEVICE FOR USING THE SAME

BACKGROUND OF THE INVENTION

Field of Invention

The present invention relates to a method for displaying photos and an electronic device. More particularly, the present invention relates to a method for successively displaying photos which are successively captured in a burst mode.

Description of Related Art

In early days, cameras adopting soft films are used for taking pictures and recording static pictures, however, the images cannot be viewed immediately after being shot, and furthermore, additional time and money must be spent on developing the films into photos. Therefore, in the coming digital era, the cameras in early days have been gradually replaced by digital cameras, which are capable of viewing images in real time, and even directly transmitting the images to the connected printing machine, so as to develop into photos.

While the camera is operated in a burst mode, continue photos are successively shot so that the continue movements of the shot object can be well recorded by the continue photos. However, when perceiving the photos shot in the burst mode, the user only can perceive the photos one by one so that it is hard for the user to perceive the continue movement of the shot object in the continue photos, which forfeits the purpose and the entertainment of taking continue photos in the burst mode.

SUMMARY OF THE INVENTION

The present invention is to provide a method for displaying photos and an electronic device capable of successively displaying the continue photos which are successively shot in a burst mode.

The invention provides a method for displaying photos for an electronic device. The method of the present invention comprises displaying a photo marked with a burst shooting icon, wherein the displayed photo corresponds to a photo group having a plurality of photos successively taken by a camera in a burst mode. A selection signal is received through the burst shooting icon. Upon the received selection signal, one of the photos in the photo group is displayed accompanying with a tool bar, wherein the tool bar at least includes a seek bar and a play key. An operating signal is received and upon the received operating signal, the photos in the photo group are displayed. When the received operating signal is for dragging the seek bar, the photos are sequentially displayed with a displaying photo rate, and the displaying photo rate is in accordance with a moving rate of the dragged seek bar. When the received operating signal is generated by clicking the play key, the photos are automatically and sequentially displayed with a predetermined photo rate.

According to one embodiment of the present invention, when the received operating signal is for dragging the seek bar in a forward playing direction, the photos are sequentially displayed in compliance with a photo shooting order in which the photos of the photo group are successively taken.

According to one embodiment of the present invention, when the received operating signal is for dragging the seek bar in a backward playing direction, the photos are sequentially displayed in compliance with a reverse of a photo shooting order in which the photos of the photo group are successively taken.

According to one embodiment of the present invention, the step of displaying the photo marked with the burst shooting icon comprises checking the photo to be displayed to obtained a checking result and displaying the photo, wherein, upon the checking result, when the photo is stored in a database with a flag indicating that the photo belongs to the photo group or a file name of the photo reveals that the photo belongs to the photo group, the photo is displayed with the burst shooting icon.

According to one embodiment of the present invention, the displayed photo is a cover photo of the photo group and the step of displaying one of the photos in the photo group upon the received selection signal further comprises, upon the received selection signal, finding the photos belonging to the photo group from a database according to a file path of the cover photo and displaying one of the photos in the photo group.

According to one embodiment of the present invention, the tool bar further comprises a first key and the step of displaying the photos in the photo group comprises displaying the photos one by one in compliance with a photo shooting order in which the photos of the photo group are successively taken when the operating signal is generated by clicking the first key.

According to one embodiment of the present invention, the tool bar further comprises a second key and the step of displaying the photos in the photo group comprises displaying the photos one by one in compliance with a reverse of a photo shooting order in which the photos of the photo group are successively taken when the operating signal is generated by clicking the second key.

The invention further provides an electronic device. The electronic device comprises a display, a receiver, a storage device and a processing unit. The display displays a photo marked with a burst shooting icon, wherein the displayed photo corresponds to a photo group having a plurality of photos successively taken by a camera in a burst mode. The receiver receives a selection signal through the burst shooting icon and receiving an operating signal. The storage device stores a computer readable and writable program and a database. The processing unit is coupled to the display, the receiver and the storage device. The processing unit executes a plurality of instructions of the computer readable and writable program and the instructions comprises displaying one of the photos in the photo group accompanying with a tool bar according to the received selection signal, wherein the tool bar at least includes a seek bar and a play key. Upon the received operating signal through the tool bar, the photos in the photo group are displayed. When the received operating signal is for dragging the seek bar, the photos are sequentially displayed with a displaying photo rate, and the displaying photo rate is in accordance with a moving rate of the dragged seek bar. When the received operating signal is generated by clicking the play key, the photos are automatically and sequentially displayed with a predetermined photo rate.

According to one embodiment of the present invention, the instructions further comprise sequentially displaying the photos in compliance with a photo shooting order in which the photos of the photo group are successively taken when the received operating signal is for dragging the seek bar in a forward playing direction.

According to one embodiment of the present invention, the instructions further comprise sequentially displaying the photos in compliance with a reverse of a photo shooting order in which the photos of the photo group are successively taken when the received operating signal is for dragging the seek bar in a backward playing direction.

According to one embodiment of the present invention, while the display displays the photo marked with the burst shooting icon, the instructions further comprise checking the photo to be displayed to obtained a checking result and displaying the photo, wherein, upon the checking result, when the photo is stored in the database with a flag indicating that the photo belongs to the photo group or a file name of the photo reveals that the photo belongs to the photo group, the photo is displayed with the burst shooting icon.

According to one embodiment of the present invention, the displayed photo is a cover photo of the photo group and the instruction of displaying one of the photos in the photo group upon the received selection signal further comprises finding the photos belonging to the photo group from the database according to a file path of the cover photo according to the received selection signal and displaying one of the photos in the photo group.

According to one embodiment of the present invention, the tool bar further comprises a first key and the instruction of displaying the photos in the photo group comprises, displaying the photos one by one in compliance with a photo shooting order in which the photos of the photo group are successively taken when the operating signal is generated by clicking the first key.

According to one embodiment of the present invention, the tool bar further comprises a second key and the instruction of displaying the photos in the photo group comprises displaying the photos one by one in compliance with a reverse of a photo shooting order in which the photos of the photo group are successively taken when the operating signal is generated by clicking the second key.

In the present invention, upon the received selection signal through the burst shooting icon labeled on the cover photo of the photo group, one of the photos in the photo group is displayed with the tool bar. By controlling the seek bar or the play key of the tool bar, the photos of the photo group which are successively shot in a burst mode can be successively displayed according to the operating behavior made on the tool bar. More specifically, the user can perceive the successively displayed photos in a way similar to the way of playing a video. Thus, the way for displaying the photos shot in quick succession provides the user a new and interesting way to perceive the photos and further entertains the user.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
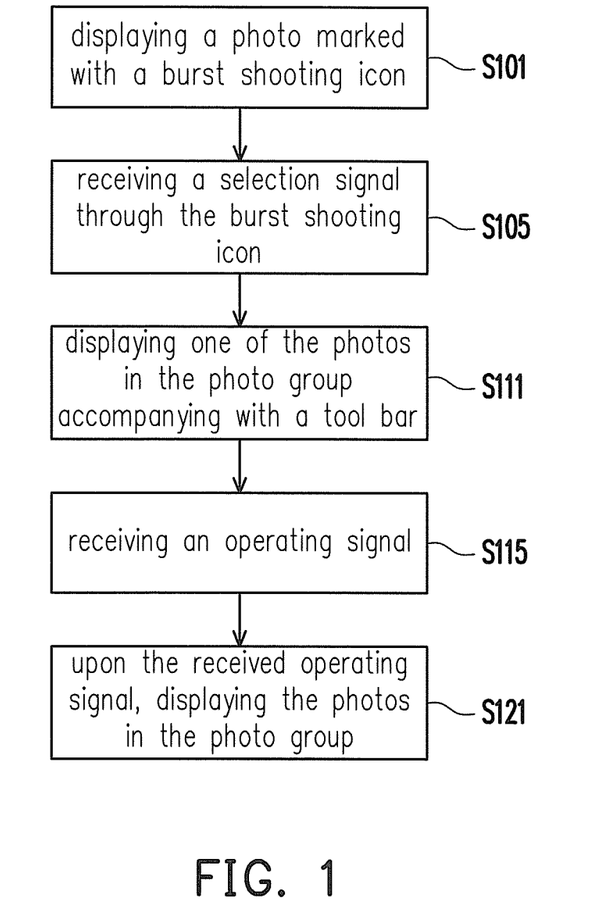
FIG. 1 is a flow chart illustrating a method of displaying photos according to one embodiment of the present invention.
Figure 2A:
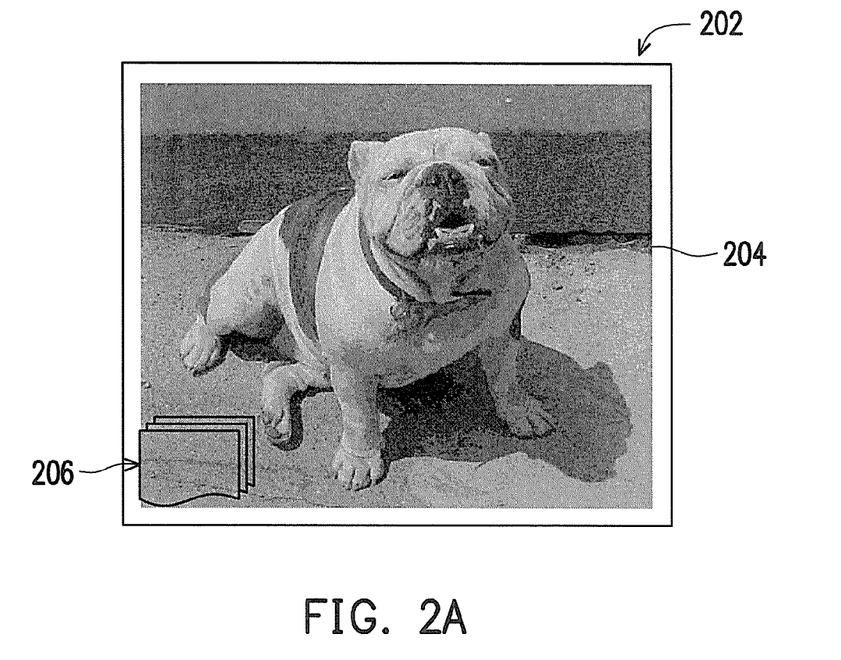
FIG. 2A is a schematic drawing showing a photo representing a photo group and displayed by a display according to one embodiment of the present invention.

FIG. 1 is a flow chart illustrating a method of displaying photos according to one embodiment of the present invention. FIG. 2A is a schematic drawing showing a photo representing a photo group and displayed by a display according to one embodiment of the present invention. In the present embodiment, the method of displaying photos is adopted to an electronic device. The electronic device can be, for example, a portable device such as a mobile phone, smart phone, a personal digital assistant, a tablet PC, a notebook, a camera, a digital camera or any electronic device capable of displaying photos. Furthermore, the electronic device can be, for example, a personal computer, a multimedia player or any electronic device equipped with a display.

Figure 3:
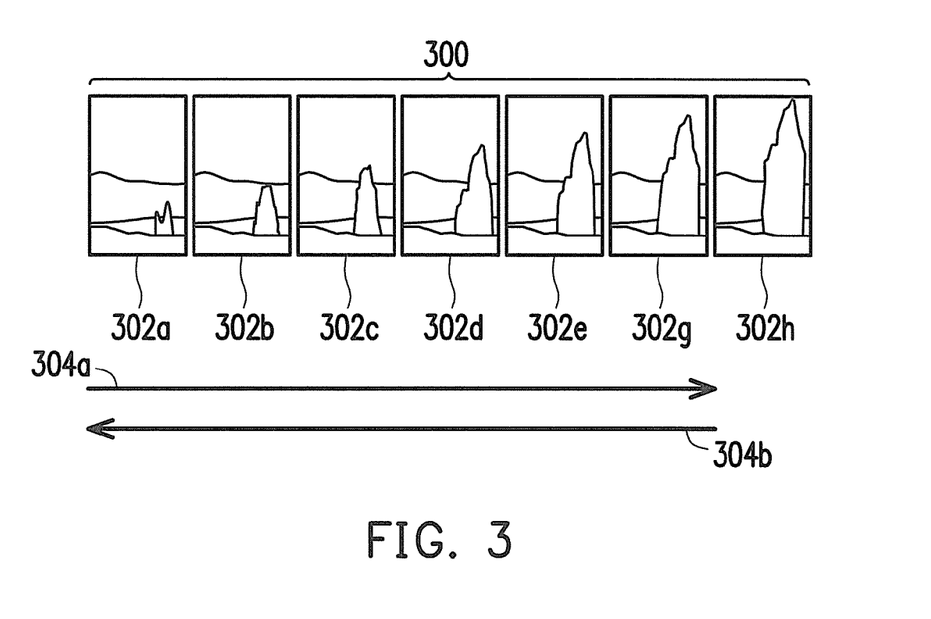
FIG. 3 is a sequence of continue photos successively taken in a burst mode.

As shown in FIG. 1 and FIG. 2A, in the step S101, a display 202 of the electronic device displays a photo 204 marked with a burst shooting icon 206. It should be noticed that the displayed photo 204 marked with the burst shooting icon 206 corresponds to a photo group having a plurality of photos successively taken by a camera in a burst mode. Noticeably, the aforementioned burst mode is a shooting mode in camera. Under this burst mode, the photos in the photo group are captured in quick succession by either single pressing the shutter button of the camera or holding the shutter button down. For instance, as shown in FIG. 3 which shows a sequence of continue photos successively taken in a burst mode, the continue photos 302a-302h of the photo group 300 are successively captured in one burst shot. Further, the photo 302a is the first in the sequence (i.e. the photo shooting order) of the continue photos and the photo 302h is the last in the sequence. Under the burst mode, the eruption of a geyser is completely captured by eight photos. In one embodiment, the photos which are successively taken can be, for example, stored in a database of the electronic device with flags respectively to indicate that the photos are captured in the same quick succession or can be, for example, respectively given file names each of which reveals that the photos are captured in the same quick succession. Noticeably, the photo displayed with the burst shooting icon and belonging to the photo group is regarded as a cover photo of the photo group. Furthermore, the cover photo can be one of the photos in the photo group. In other words, the cover photo can be picked from the photos in the photo group according to some rules or determined by the user.

Figure 4:
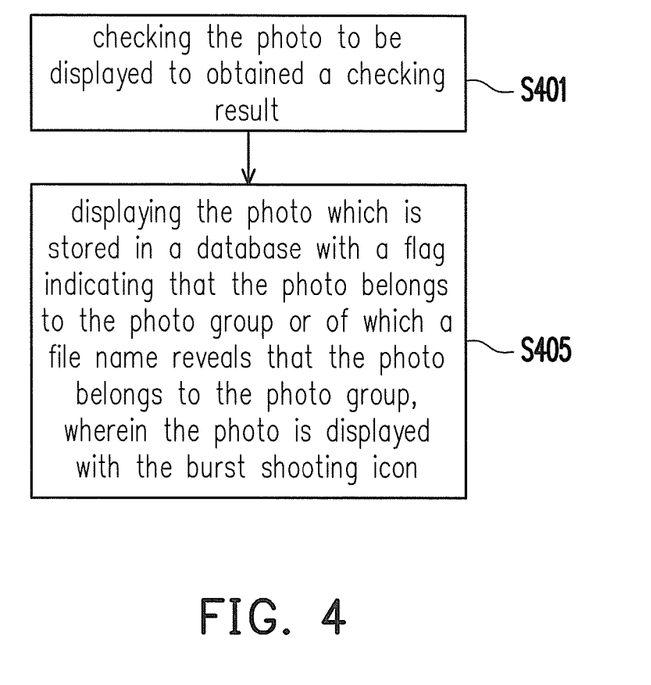
FIG. 4 is a flow chart illustrating a step of displaying a photo representing a photo group according to one embodiment of the present invention.

FIG. 4 is a flow chart illustrating a step of displaying a photo representing a photo group according to one embodiment of the present invention. As shown in FIG. 4, in another embodiment, while the display 200 of the electronic device switches from displaying a photo to displaying another photo, a checking process is performed to check the photo to be displayed to obtained a checking result (step S401). In this checking process, the photo to be displayed is checked whether the photo to be displayed is stored in the database with a flag showing that the photo is taken in a burst mode and belongs to a photo group or whether the filename of the photo to be displayed reveals that the photo is taken in the burst mode and belongs to a photo group. In the step S405, the photo is displayed by the display 202. It should be noticed that, upon the checking result, when it is determined that the photo is stored in a database with a flag indicating that the photo is taken in the burst mode and belongs to the photo group or it is determined that the file name of the photo reveals that the photo is taken in the burst mode and belongs to the photo group, the photo is displayed with the burst shooting icon (as shown in FIG. 2A). Otherwise, the photo is displayed without being labeled by the burst shooting icon.

Figure 2B:
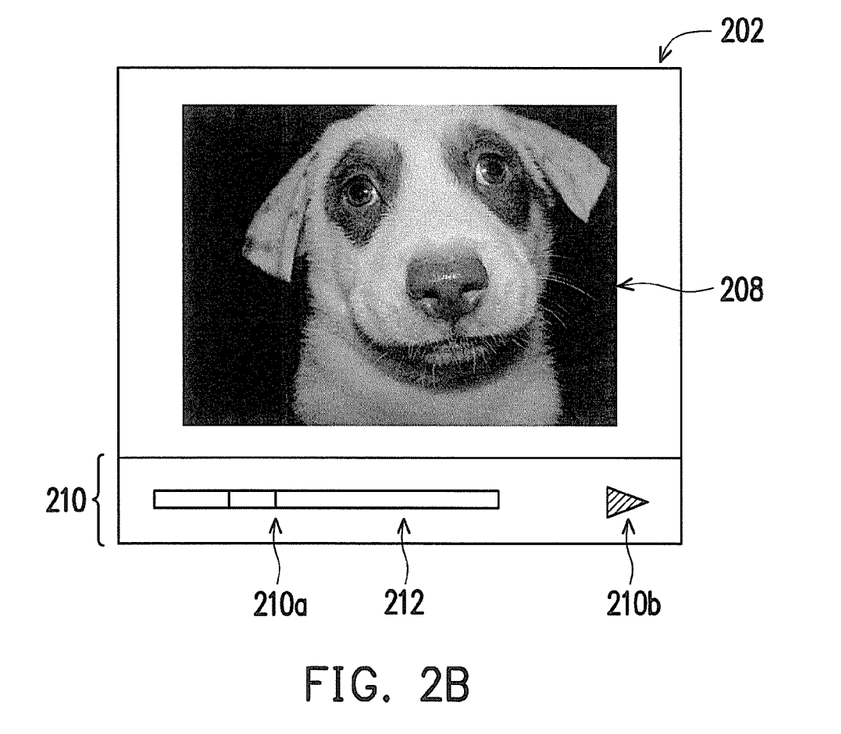
FIG. 2B is a schematic drawing showing one of the photos in the photo group displayed with a tool bar according to one embodiment of the present invention.

As shown in FIG. 1 and FIG. 2A, a selection signal is received through the burst shooting icon 206 on the photo 204 (step S105). In the step S111, upon the received selection signal, displaying one of the photos in the photo group accompanying with a tool bar 210 (as shown in FIG. 2B). It should be noticed that the tool bar 210 at least includes a seek bar 210a and a play key 210b. Further, the seek bar 210a can be controlled to move along a trough 212 by the operating signal for continuously displaying photos in the photo group from one to another.

Figure 5:
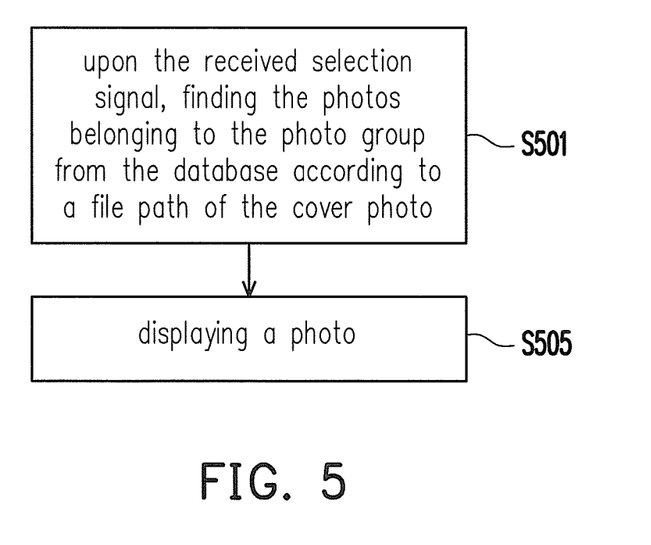
FIG. 5 is a flow chart illustrating a step of displaying one of the photos in the photo group upon the received selection signal according to one embodiment of the present invention.

FIG. 5 is a flow chart illustrating a step of displaying one of the photos in the photo group upon the received selection signal according to one embodiment of the present invention. In one embodiment shown in FIG. 5, the step S111 for displaying one of the photos in the photo group upon the received selection signal comprises finding the photos belonging to the photo group from the database according to the file path of the cover photo (step S501) and displaying one photo of the photo group (step S505). It should be noticed that the displayed photo in step S505 can be any photo in the photo group corresponding to the photo displayed with the burst shooting icon in the step S101. In one embodiment, the displayed photo in step S505 can be, for example, the first in the photo shooting order in which the photos of the photo group are successively taken. For instance, as the sequence of continue photos successively taken in a burst mode shown in FIG. 3, the first photo 302a in the sequence is displayed in the step S505.

Moreover, as shown in FIG. 1 and FIG. 2B, an operating signal is received through the tool bar 210 (step S115) and the photos in the photo group are displayed according to the operating signal (step S121). That is, upon different operating signals, the ways for displaying the photos in the photo group are different.

For instance, when the received operating signal is for dragging the seek bar 210a along the trough 212, the photos are sequentially displayed with a displaying photo rate and the displaying photo rate is in accordance with a moving rate of the dragged seek bar 210a. More specifically, when the received operating signal is for dragging the seek bar 210a in a forward playing direction which is in the same direction as the direction pointed by the tip of the play key 210b, the photos are sequentially displayed in compliance with the photo shooting order in which the photos of the photo group are successively taken. In other words, taking the sequence of continue photos showing an eruption of geyser shown in FIG. 3 as an example, the photo shooting order of the sequence of the continue photos is represented by an arrow labeled 304a. Thus, under the scenario mentioned above, the continue photos of the photo group 300 shown in FIG. 3 are sequentially displayed from the first photo 302a to the last photo 302h in the sequence.

Also, when the received operating signal is for dragging the seek bar in a backward playing direction which is in the opposite direction as the direction pointed by the tip of the play key 210b, the photos are sequentially displayed in compliance with the reverse of the photo shooting order in which the photos of the photo group are successively taken. In other words, taking the sequence of continue photos showing an eruption of geyser shown in FIG. 3 as an example, the reverse of the photo shooting order of the sequence of the continue photos is represented by an arrow labeled 304b. Thus, under the scenario mentioned above, the continue photos of the photo group 300 shown in FIG. 3 are sequentially displayed from the last photo 302h to the first photo 302a in the sequence.

Alternatively, when the received operating signal is generated by clicking the play key 210b, the photos are automatically and sequentially displayed with a predetermined photo rate. In other words, the photos are automatically displayed in sequence in a display mode which is similar to the video play mode for continuously playing frames of the video. Furthermore, the predetermined photo rate can be, for example, four-ten shots per second.

Figure 2C:
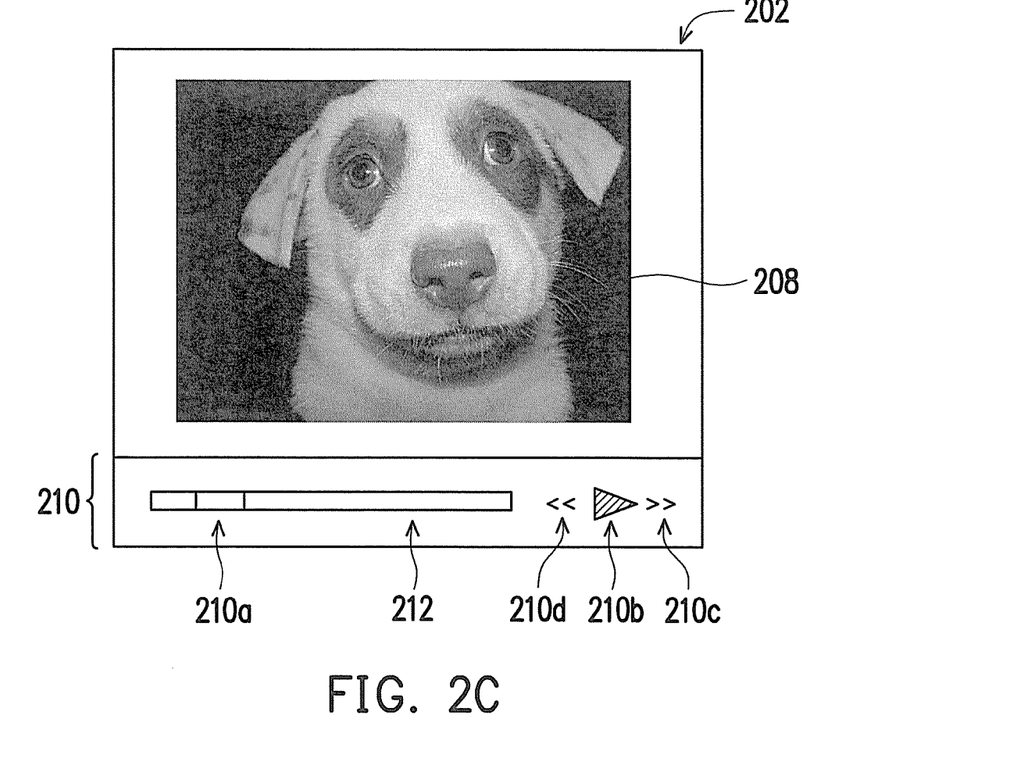
FIG. 2C is a schematic drawing showing one of the photos in the photo group displayed with a tool bar according to another embodiment of the present invention.

FIG. 2C is a schematic drawing showing one of the photos in the photo group displayed with a tool bar according to another embodiment of the present invention. In another embodiment of the present invention shown in FIG. 2C, the tool bar 210 not only possesses the seek bar 210a and the play key 210b but also has a first key 210c and a second key 210d. The first key 210c is regarded as a forward play key and the second key 210d is regarded as a rewind key. When the operating signal is generated by clicking the first key 210c, the photos are displayed one by one in compliance with the photo shooting order in which the photos of the photo group are successively taken. That is, one photo is displayed at one time the first key is clicked. Moreover, upon multi-clicking behavior on the first key, the photos are displayed one by one in compliance with the photo shooting order. Alternatively, when the operating signal is generated by clicking the second key 210d, the photos are displayed one by one in compliance with the reverse of the photo shooting order in which the photos of the photo group are successively taken. That is, one photo is displayed at one time the second key is clicked. Moreover, upon multi-clicking behavior on the second key, the photos are displayed one by one in compliance with the reverse of the photo shooting order.

Figure 6:
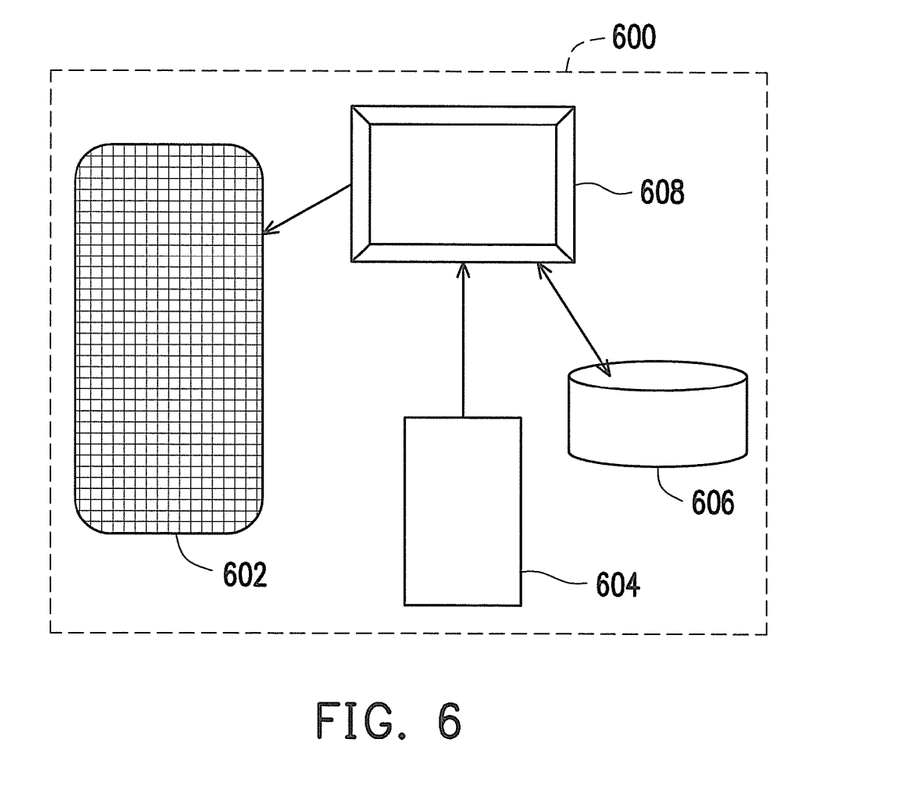
FIG. 6 is a schematic diagram showing an electronic device according to one embodiment of the present invention.

FIG. 6 is a schematic diagram showing an electronic device according to one embodiment of the present invention. As shown in FIG. 6, in the present embodiment, the electronic device 600 comprises a display 602, a receiver 604, a storage device 606 and a processing unit 608. The display 602 displays a photo marked with a burst shooting icon. More specifically, the photo marked with the burst shooting icon represents a photo group having continue photos captured in quick succession and the photo marked with the burst shooting icon is the cover photo of the photo group. In addition, the receiver 604 receives a selection signal through the burst shooting icon and receives an operating signal for displaying the photos. Moreover, the storage device 606 stores a computer readable and writable program and further stores a database for storing the photos. The processing unit 608 is coupled to the display 602, the receiver 604 and the storage device 606. The processing unit executes a plurality of instructions of the computer readable and writable program for implementing the method of displaying photo according to the aforementioned embodiment of the present invention.

It should be noted that the processing unit 608 executes the instructions for displaying one of the photos in the photo group accompanying with a tool bar according to the received selection signal (step S111 shown in FIG. 1) and displaying the photos in the photo group according to the received operating signal (step S121 shown in FIG. 1).

Moreover, the aforementioned instruction of displaying one of the photos in the photo group upon the received selection signal further comprises finding the photos belonging to the photo group from the database according to a file path of the cover photo (step S501 in FIG. 5) and displaying one of the photos in the photo group (step S505 in FIG. 5). The instructions and the definition of the terms used for describing the instructions are detailed in the previous embodiment for illustrating the method for displaying photos of the present invention and are not further described herein.

Also, when the received operating signal is generated by clicking the play key, the processing unit 608 executes the instructions so that the display 602 automatically and sequentially displays the photos with a predetermined photo rate. When the received operating signal is for dragging the seek bar, the processing unit 608 executes the instructions so that the display 602 sequentially displays the photos with a displaying photo rate, and the displaying photo rate is in accordance with a moving rate of the dragged seek bar. Moreover, when the received operating signal is for dragging the seek bar in a forward playing direction, the processing unit 608 executes the instructions so that the display 602 displays the photos sequentially in compliance with a photo shooting order in which the photos of the photo group are successively taken. Furthermore, when the received operating signal is for dragging the seek bar in a backward playing direction, the processing unit 608 executes the instructions so that the display 602 displays the photos sequentially in compliance with a reverse of a photo shooting order in which the photos of the photo group are successively taken. The instructions and the definition of the terms used for describing the instructions are detailed in the previous embodiment for illustrating the method for displaying photos of the present invention and are not further described herein.

It should be noticed that while the display 602 displays the photo marked with the burst shooting icon, the processing unit 608 executes the instructions for checking the photo to be displayed to obtained a checking result (step S401 shown in FIG. 4) and displaying the photo (step S405 shown in FIG. 4), wherein, upon the checking result, when the photo is stored in the database with a flag indicating that the photo belongs to the photo group or a file name of the photo reveals that the photo belongs to the photo group, the photo is displayed with the burst shooting icon. The instructions and the definition of the terms used for describing the instructions are detailed in the previous embodiment for illustrating the method for displaying photos of the present invention and are not further described herein.

In addition, except for the seek bar and the play key, the tool bar further comprises a first key (which is labeled 210*c* in FIG. 2C) and a second key (which is labeled 210*d* in FIG. 2C). Hence, when the operating signal is generated by clicking the first key, the processing unit 608 executes the instruction for displaying the photos in the photo group one by one in compliance with a photo shooting order in which the photos of the photo group are successively taken. Moreover, when the operating signal is generated by clicking the second key, the processing unit 608 executes the instruction for displaying the photos one by one in compliance with a reverse of a photo shooting order in which the photos of the photo group are successively taken. The instructions and the definition of the terms used for describing the instructions are detailed in the previous embodiment for illustrating the method for displaying photos of the present invention and are not further described herein.

In the present invention, upon the received selection signal through the burst shooting icon labeled on the cover photo of the photo group, one of the photos in the photo group is displayed with the tool bar. By controlling the seek bar or the play key of the tool bar, the photos of the photo group which are successively shot in a burst mode can be successively displayed according to the operating behavior made on the tool bar. More specifically, the user can perceive the successively displayed photos in a way similar to the way of playing a video. Thus, the way for displaying the photos shot in quick succession provides the user a new and interesting way to perceive the photos and further entertains the user.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for displaying photos, comprising:
   displaying a photo marked with a burst shooting icon when the displayed photo corresponds to a photo group having a plurality of photos successively taken by a camera in a burst mode;
   displaying the photo without being marked with the burst shooting icon when the displayed photo does not correspond to the photo group;
   receiving a selection signal through the burst shooting icon when the photo is displayed with the burst shooting icon;
   upon the received selection signal, displaying one of the photos in the photo group accompanying with a seek bar;
   receiving an operating signal for dragging the seek bar; and
   according to the operating signal, sequentially displaying the photos with a displaying photo rate, wherein the displaying photo rate is in accordance with a moving rate of the dragged seek bar.

2. The method of claim 1, wherein when the received operating signal for dragging the seek bar is in a forward playing direction, the photos are sequentially displayed in compliance with a photo shooting order in which the photos of the photo group are successively taken.

3. The method of claim 1, wherein when the received operating signal for dragging the seek bar is in a backward playing direction, the photos are sequentially displayed in compliance with a reverse of a photo shooting order in which the photos of the photo group are successively taken.

4. The method of claim 1, wherein the displayed photo is a cover photo of the photo group and the step of displaying one of the photos in the photo group upon the received selection signal further comprises:
  upon the received selection signal, finding the photos belonging to the photo group from a database according to a file path of the cover photo; and
  displaying one of the photos in the photo group.

5. The method of claim 1, wherein one of the photos in the photo group is displayed further accompanying with a first key and the step of displaying the photos in the photo group comprises:
  when the operating signal is generated by clicking the first key, displaying the photos one by one in compliance with a photo shooting order in which the photos of the photo group are successively taken.

6. The method of claim 1, wherein one of the photos in the photo group is displayed further accompanying with a second key and the step of displaying the photos in the photo group comprises:
  when the operating signal is generated by clicking the second key, displaying the photos one by one in compliance with a reverse of a photo shooting order in which the photos of the photo group are successively taken.

7. An electronic device, comprising:
a display displaying a photo marked with a burst shooting icon when the displayed photo corresponds to a photo group having a plurality of photos successively taken by a camera in a burst mode, and displaying the photo without being marked with the burst shooting icon when the displayed photo does not correspond to the photo group;
a receiver receiving a selection signal through the burst shooting icon when the photo is displayed with the burst shooting icon and receiving an operating signal;
a storage device storing a computer readable and writable program and a database; and
a processing unit coupled to the display, the receiver and the storage device, wherein the processing unit executes a plurality of instructions of the computer readable and writable program and the instructions comprises:
  upon the received selection signal, displaying one of the photos in the photo group accompanying with a seek bar; and
  upon the received operating signal for dragging the seek bar, sequentially displaying the photos in the photo group with a displaying photo rate, wherein the displaying photo rate is in accordance with a moving rate of the dragged seek bar.

8. The electronic device of claim 7, wherein the instructions further comprise:
  when the received operating signal for dragging the seek bar is in a forward playing direction, sequentially displaying the photos in compliance with a photo shooting order in which the photos of the photo group are successively taken.

9. The electronic device of claim 7, wherein the instructions further comprise:
  when the received operating signal for dragging the seek bar is in a backward playing direction, sequentially displaying the photos in compliance with a reverse of a photo shooting order in which the photos of the photo group are successively taken.

10. The electronic device of claim 7, wherein while the display displays the photo marked with the burst shooting icon, the instructions further comprise:
  determining whether the photo to be displayed belongs to the photo group having the plurality of photos successively taken by the camera in the burst mode by checking whether the photo to be displayed is stored in a database with a flag showing that the photo is taken in the burst mode and belongs to the photo group or whether a filename of the photo to be displayed reveals that the photo is taken in the burst mode and belongs to the photo group to obtain a checking result; and
  displaying the photo, wherein, upon the checking result, when the photo is stored in the database with the flag indicating that the photo belongs to the photo group or the file name of the photo reveals that the photo belongs to the photo group, the checked photo is displayed with the burst shooting icon without displaying another one or more photos of the photo group when the checked photo belongs to the photo group having the photos successively taken by the camera in the burst mode, wherein the burst shooting icon is displayed on the checked photo.

11. The electronic device of claim 7, wherein the displayed photo is a cover photo of the photo group and the instruction of displaying one of the photos in the photo group upon the received selection signal further comprises:
  upon the received selection signal, finding the photos belonging to the photo group from the database according to a file path of the cover photo; and
  displaying one of the photos in the photo group.

12. The electronic device of claim 7, wherein one of the photos in the photo group is displayed further accompanying with a first key and the instruction of displaying the photos in the photo group comprises:
  when the operating signal is generated by clicking the first key, displaying the photos one by one in compliance with a photo shooting order in which the photos of the photo group are successively taken.

13. The electronic device of claim 7, wherein one of the photos in the photo group is displayed further accompanying with a second key and the instruction of displaying the photos in the photo group comprises:
  when the operating signal is generated by clicking the second key, displaying the photos one by one in compliance with a reverse of a photo shooting order in which the photos of the photo group are successively taken.

14. A photo displaying method, comprising:
checking a photo to be displayed to obtain a checking result; and
displaying the checked photo,
  wherein, when the checking result reveals that the checked photo belongs to a photo group having a plurality of photos successively taken by a camera in a burst mode, the checked photo is displayed with a burst shooting icon,
  when the checking result reveals that the checked photo does not belong to the photo group having the plurality of photos successively taken by the camera in the burst mode, the checked photo is displayed without being marked with the burst shooting icon.

15. The photo displaying method of claim 14, wherein the step of checking the photo to be displayed comprises:
  checking whether photo to be displayed is stored in a database with a flag indicating the photo to be displayed belonging to the photo group.

16. The photo displaying method of claim 14, wherein the step of checking the photo to be displayed comprises:

checking whether a filename of the photo to be displayed reveals that the photo to be displayed is taken in the burst mode and belongs to the photo group.

17. The method of claim 1, wherein before the step of displaying the photo marked with the burst shooting icon, the method further comprises:
   checking whether the photo to be displayed belongs to the photo group in the burst mode; and
   displaying the photo marked with the bust shooting icon when determining that the photo to be displayed belongs to the photo group in the burst mode.

18. The electronic device of claim 7, wherein the instructions further comprises:
   checking whether the photo to be displayed belongs to the photo group in the burst mode; and
   displaying the photo marked with the bust shooting icon on the display when determining that the photo to be displayed belongs to the photo group in the burst mode.

19. The photo displaying method of claim 14, wherein the steps of checking the photo to be display to obtain the checking result comprises:
   checking whether the photo to be displayed belongs to the photo group in the burst mode to obtain the checking result.

20. The method of claim 1, wherein before the step of displaying the photo marked with a burst shooting icon, the method further comprising:
   determining whether the photo to be displayed belongs to the photo group having the plurality of photos successively taken by the camera in the burst mode by checking whether the photo to be displayed is stored in a database with a flag showing that the photo is taken in the burst mode and belongs to the photo group or whether a filename of the photo to be displayed reveals that the photo is taken in the burst mode and belongs to the photo group,
   wherein the step of displaying a photo marked with a burst shooting icon comprises displaying the checked photo and the burst shooting icon without displaying another one or more photos of the photo group when the checked photo belongs to the photo group having the photos successively taken by the camera in the burst mode, wherein the burst shooting icon is displayed on the checked photo.

21. A photo display method of claim 14, wherein the step of checking the photo to be displayed to obtain the checking result comprises determining whether the photo to be displayed belongs to the photo group having the plurality of photos successively taken by the camera in the burst mode by checking whether the photo to be displayed is stored in a database with a flag showing that the photo is taken in the burst mode and belongs to the photo group or whether a filename of the photo to be displayed reveals that the photo is taken in the burst mode and belongs to the photo group,
   wherein the step of displaying the checked photo comprises displaying the checked photo and the burst shooting icon without displaying another one or more photos of the photo group when the checked photo belongs to the photo group having the photos successively taken by the camera in the burst mode, wherein the burst shooting icon is displayed on the checked photo.

\* \* \* \* \*